(12) United States Patent
Varadaraj

(10) Patent No.: US 7,652,073 B2
(45) Date of Patent: Jan. 26, 2010

(54) OIL-IN-WATER-IN-OIL EMULSION

(75) Inventor: Ramesh Varadaraj, Flemington, NJ (US)

(73) Assignee: ExxonMobil Upstream Research Company, Houston, TX (US)

( * ) Notice: Subject to any disclaimer, the term of this patent is extended or adjusted under 35 U.S.C. 154(b) by 53 days.

(21) Appl. No.: 12/002,868

(22) Filed: Dec. 19, 2007

(65) Prior Publication Data

US 2008/0103077 A1 May 1, 2008

Related U.S. Application Data

(62) Division of application No. 10/422,388, filed on Apr. 23, 2003, now Pat. No. 7,338,924.

(60) Provisional application No. 60/377,305, filed on May 2, 2002.

(51) Int. Cl.
*B01F 3/08* (2006.01)
(52) U.S. Cl. .......................... 516/22; 516/929
(58) Field of Classification Search .................... 516/22, 516/929; 507/263, 202, 267; 166/270, 270.1, 166/270.2
See application file for complete search history.

(56) References Cited

U.S. PATENT DOCUMENTS

| | | |
|---|---|---|
| 2,241,273 A | 5/1941 | Robinson et al. |
| 2,300,590 A | 11/1942 | O'Brien |
| 3,149,669 A | 9/1964 | Binder, Jr. et al. |
| 3,208,515 A | 9/1965 | Meadors |
| 3,330,348 A | 7/1967 | Hardy et al. |
| 3,356,138 A | 12/1967 | Davis, Jr. et al. |
| 3,380,531 A | 4/1968 | McAuliffe et al. |
| 3,386,514 A | 6/1968 | Weber |
| 3,412,792 A | 11/1968 | Parker et al. |
| 3,490,471 A | 1/1970 | Carlin |
| 3,630,953 A | 12/1971 | Simon et al. |
| 3,707,459 A | 12/1972 | Mason et al. |
| 3,796,266 A | 3/1974 | Carlin et al. |
| 3,804,760 A | 4/1974 | Darley |
| 3,818,989 A | 6/1974 | Christopher, Jr. et al. |
| 3,866,680 A | 2/1975 | Dauben |
| 3,929,190 A | 12/1975 | Chang et al. |
| 3,980,136 A | 9/1976 | Plummer et al. |
| 4,011,908 A | 3/1977 | Holm |
| 4,085,799 A | 4/1978 | Bousaid et al. |
| 4,096,914 A | 6/1978 | McLaughlin et al. |
| 4,216,828 A | 8/1980 | Blair |
| 4,219,082 A | 8/1980 | Kalfoglou |
| 4,233,165 A | 11/1980 | Salathiel et al. |
| 4,248,304 A | 2/1981 | Phillips |
| 4,274,956 A | 6/1981 | Stewart |
| 4,291,766 A | 9/1981 | Davies et al. |
| 4,298,455 A | 11/1981 | Huang |
| 4,359,391 A | 11/1982 | Salathiel et al. |
| 4,384,997 A | 5/1983 | Detroit |
| 4,391,925 A | 7/1983 | Mintz et al. |
| 4,411,770 A | 10/1983 | Chen et al. |
| 4,427,069 A | 1/1984 | Friedman |
| 4,505,828 A | 3/1985 | Lipowski et al. |
| 4,592,830 A | 6/1986 | Howell et al. |
| 4,659,453 A | 4/1987 | Kukes et al. |
| 4,669,543 A | 6/1987 | Young |
| 4,780,243 A | 10/1988 | Edgley et al. |
| 4,790,382 A | 12/1988 | Morrow et al. |
| 4,966,235 A | 10/1990 | Gregoli et al. |
| 5,080,809 A | 1/1992 | Stahl et al. |
| 5,095,986 A | 3/1992 | Naae et al. |
| 5,199,492 A | 4/1993 | Surles et al. |
| 5,294,353 A | 3/1994 | Dill |
| 5,302,293 A | 4/1994 | Kaplan et al. |
| 5,350,014 A | 9/1994 | McKay |
| 5,360,558 A | 11/1994 | Pakulski et al. |
| 5,424,285 A | 6/1995 | Stacy et al. |
| 5,490,940 A | 2/1996 | Bragg et al. |
| 5,499,677 A | 3/1996 | Cowan |
| 5,627,143 A | 5/1997 | Sawdon |
| 5,806,593 A | 9/1998 | Surles |
| 5,820,750 A | 10/1998 | Blum et al. |
| 5,855,243 A | 1/1999 | Bragg |
| 5,910,467 A | 6/1999 | Bragg |
| 5,927,404 A | 7/1999 | Bragg |

(Continued)

FOREIGN PATENT DOCUMENTS

CA 2044473 12/1992

(Continued)

OTHER PUBLICATIONS

Soo, H., Williams, M.C., and Radke, CJ. "A Filtration Model For The Flow Of Dilute, Stable Emulsions In Porous Media—Ii. Parameter Evaluation And Estimation", *Chemical Engineering Science*, vol. 41, No. 2 (1986) pp. 273-281.

(Continued)

*Primary Examiner*—Daniel S Metzmaier

(57) ABSTRACT

An oil-in-water-in-oil emulsion (O/W/O) comprising a first oil-in-water emulsion dispersed in a second oil, and a method of preparing the same. The O/W/O emulsion can be used as a drive fluid in an enhanced oil recovery process. The O/W/O emulsion of this invention may also be used as a lubricant, and has the beneficial property of being resistant to shear forces.

5 Claims, 1 Drawing Sheet

U.S. PATENT DOCUMENTS

| | | | |
|---|---|---|---|
| 5,964,906 A | 10/1999 | Layrisse et al. | |
| 5,985,177 A | 11/1999 | Yoshida et al. | |
| 6,022,471 A | 2/2000 | Wachter et al. | |
| 6,068,054 A | 5/2000 | Bragg | |
| 6,069,178 A | 5/2000 | Layrisse et al. | |
| 6,150,425 A * | 11/2000 | Sekine et al. | 516/22 |
| 6,527,842 B1 * | 3/2003 | Adams et al. | 106/31.26 |
| 6,632,778 B1 | 10/2003 | Ayoub et al. | |
| 6,988,550 B2 | 1/2006 | Bragg | |
| 7,186,673 B2 | 3/2007 | Varadaraj et al. | |
| 2001/0049341 A1 * | 12/2001 | Bland et al. | 507/100 |

FOREIGN PATENT DOCUMENTS

| | | |
|---|---|---|
| EP | 0 130 632 A2 | 1/1985 |
| EP | 0175511 | 1/1988 |
| RU | 2057914 C1 | 4/1996 |
| SU | 1682539 A1 | 11/1989 |
| SU | 1796013 A3 | 2/1993 |
| WO | WO 01/81718 | 11/2001 |
| WO | WO 01/83637 | 11/2001 |

OTHER PUBLICATIONS

Menon, V.B. and Wasan, D.T. "Characterization of Oil—Water Interfaces Containing Finely Divided Solids with Applications to the Coalescence of Water-in-Oil Emulsions: A Review", *Colloids and Surfaces*, 29 (1988) pp. 7-27.

Sundstrom, Donald W. and Klei, Herbert E. "Wastewater Treatment", *Department of Chemical Engineering, The University of Connecticut* (1979) pp. 10-13, (Prentice-Hall, Englewood Cliffs NJ.

Chung, Keng H. and Butler, Roger M. "In-Situ Emulsification By The Condensation Of Steam In Contact With Bitumen", *39th Annual Technical Meeting of the Petroleum Society of CIM* (Jun. 12-16, 1988) Paper No. 88-39-18 pp. 18-1 to 18-17.

Rege, S.D. and Fogler, H.S. "A Network Model for Deep Bed Filtration of Solid Particles and Emulsion Drops", *AIChE Journal*, vol. 34, No. 11 (Nov. 1988) pp. 1761-1772.

Fiori, Marco and Farouq Ali, S.M. "Optimal Emulsion Design For The Recovery Of A Saskatchewan Crude", *40th Annual Technical Meeting of the Petroleum Society of CIM* (May 28-31, 1989) Paper No. 89-40-43, pp. 43-1 to 43-28.

Mikula, R.J., Munoz, V.A., and Lam, W.W. "Microscopic Characterization of Emulsion Interfaces", *1989 Eastern Oil Shale Symposium* (Nov. 15-17, 1989) Institute for Mining and Minerals Research, University of Kentucky, pp. 287-292.

Levine, S. and Bowen, B.D. "Capillary interaction of spherical particles adsorbed on the surface of an oil/water droplet stabilized by the particles. Part I", *Colloids and Surfaces*, 59 (1991) pp. 377-386.

Levine, S. and Bowen, B.D. "Capillary interaction of spherical particles adsorbed on the surface of an oil/water droplet stabilized by the particles. Part II", *Colloids and Surfaces*, 65 (1992) pp. 273-286.

Mendoza, Humberto, Thomas, Sara, and Farouq Ali, S.M. "Effect Of Injection Rate On Emulsion Flooding For A Canadian And A Venezuelan Crude Oil", *CIM/AOSTRA 1991 Technical Conference* (Apr. 21-24, 1991) Paper No. CIM/AOSTRA 91-26, pp. 26-1 to 26-6.

Friesen, W.I. and Levine, S. "Electrostatic Interaction between Two Water-in-Oil Emulsion Droplets in an Electric Field", *Journal of Colloid and Interface Science*, vol. 150 No. 2 (May 1992) pp. 517-527.

Chen, Techien; Chakrabarty, Tapan; Cullen, Malcolm P.; Thomas, Ray R; and Sieben, Michelle C. "Laboratory And Field Evidence Of Emulsion Flow In Porous Media", *CIM/AOSTRA 1991 Technical Conference* (Apr. 21-24, 1991) Paper No. CIM/AOSTRA 91-78, pp. 78-1 to 78-14.

Yuan, F. and Pal, R. "Composition Measurement Of Emulsions And Emulsions With Added Solids Using A Microwave Technique", Sixth Petroleum Conference of The Petroleum Society of CIM, (Oct. 16-18, 1995) Paper No. 95-148, pp. 1-15.

Broz, J.S., French, T.R., and Carroll, H. B. "Blocking of High Permeability Zones In Steamflooding By Emulsions", *Third International Conference on Hemy Crude and Tar Sands*, (Jul. 22-31, 1985) vol. 1, pp. 443-451.

Dieken, F.P, Skinner, F.W., Wharmby, A.W., and Wu, S. "Methods Manual For Chemical Analysis Of Water And Wastes", Alberta Research Council (Updated Oct. 1, 1996) pp. 1-4.

Tronov, V.P. and Shireyev, A.I. "Effect Of Desalinization Of Stratal Water On Rheological And Demulsification Properties Of Forming Emulsions", Tatar Scientific Research and Planning Institute of the Petroleum Industry (1991).

\* cited by examiner

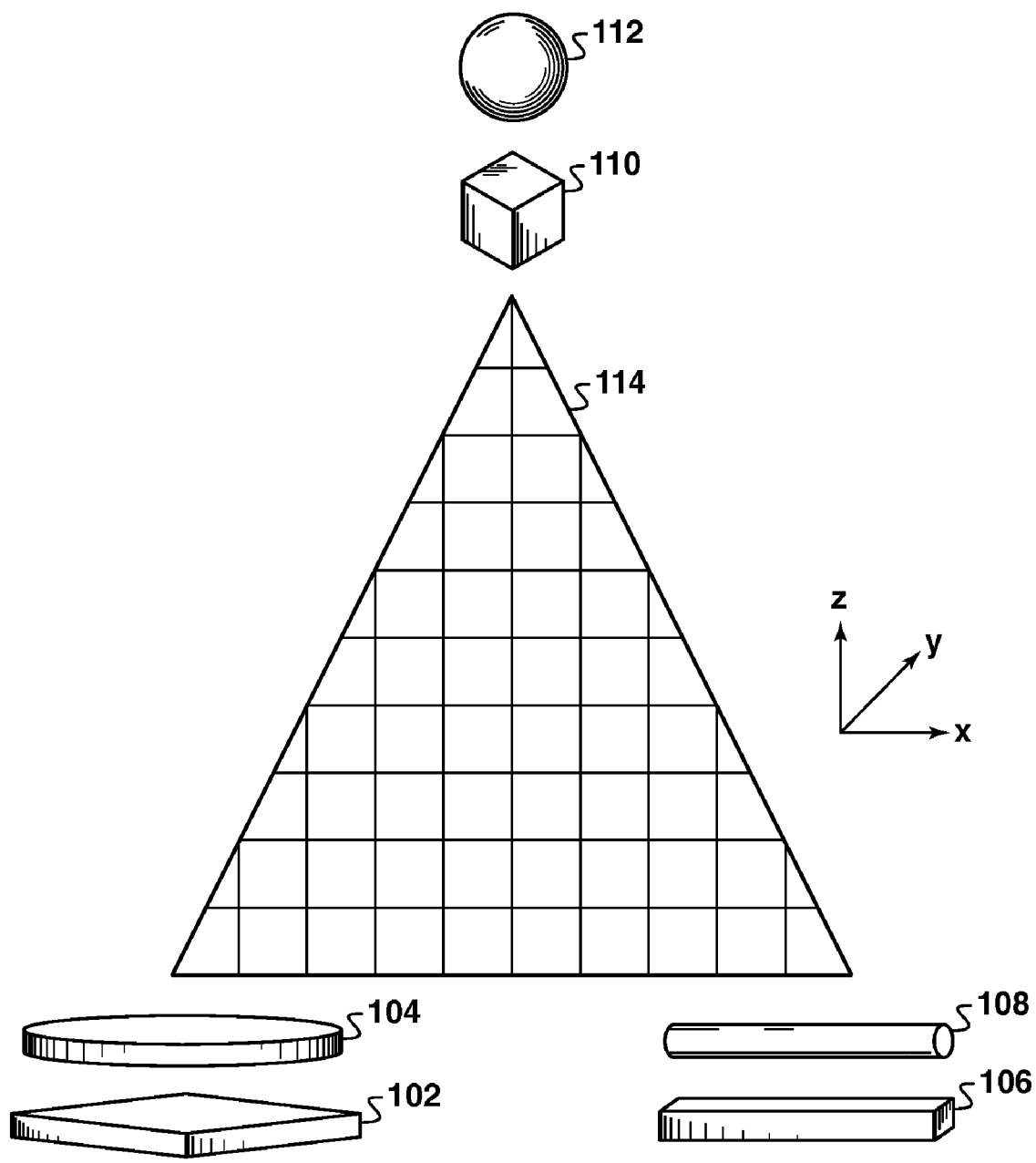
FIGURE

OIL-IN-WATER-IN-OIL EMULSION

REFERENCE TO RELATED APPLICATION

This application is a divisional of U.S. application Ser. No. 10/422,388 filed on 23 Apr. 2003, now issued U.S. Pat. No. 7,338,924, which claims the benefit of U.S. Provisional Patent Application No. 60/377,305 filed May 2, 2002.

FIELD OF THE INVENTION

The invention relates to an oil-in-water-in-oil (O/W/O) emulsion and a method of making an oil-in-water-in-oil emulsion. The novel emulsion can be used as a drive fluid for enhanced oil recovery operations, or as a lubrication fluid.

BACKGROUND OF THE INVENTION

Several different types of oil-in-water or water-in-oil emulsions are known in the art and have various uses. Such emulsions are sometimes used in enhanced oil recovery operations as a drive or pusher fluid to displace the hydrocarbons to a producing well. To be effective, the drive fluid preferably has a viscosity that is about 2 to 3 times the viscosity of the oil being displaced. A benefit of using a water-in-oil emulsion as a drive fluid is that it can be made with readily available materials in a relatively inexpensive manner. However, a 60/40 water-in-oil emulsion (60% water dispersed within 40% oil phase) will exhibit a viscosity in a range that is about 20 to 30 times that of the oil, which is higher than the desired mobility ratio for a drive fluid. Accordingly, there is a need in the industry for an economically affordable fluid with satisfactory viscosity and stability characteristics for use as an enhanced oil recovery drive fluid.

Oil-in-water and water-in-oil emulsions have also been used in lubrication applications. However, the main drawback of an emulsion lubricant is its instability to shear and its shear-thinning characteristics. Lubrication applications involve contact between moving surfaces, and emulsion instability due to shear will result in emulsion break-up and subsequent loss of ability to function as a lubricant. Accordingly, an emulsion is needed that has improved stability to shear and reduced shear-thinning for use in lubrication applications.

BRIEF DESCRIPTION OF THE FIGURES

The FIGURE is a ternary diagram that illustrates some, but not all, of the particle shapes that could be characteristic of the solid particles that may be used as a stabilizer for the oil-in-water-in-oil emulsion of this invention.

SUMMARY OF THE INVENTION

The invention is an oil-in-water-in-oil emulsion and a method for preparing the oil-in-water-in-oil emulsion. The novel emulsion comprises a first oil-in-water emulsion dispersed in a second oil. The first oil-in-water emulsion comprises a first oil, water, about 0.1 wt % to about 10 wt % of organic acid, and about 0.01 wt % to about 10 wt % of a salt of an organic acid, based on the weight of the first oil-in-water emulsion. The first oil-in-water emulsion is dispersed in a second oil to form the oil-in-water-in-oil emulsion.

In an embodiment of the invention, the novel emulsion is used as a drive fluid in an enhanced oil recovery operation to recover hydrocarbons from a subterranean reservoir.

In another embodiment of the invention, the novel emulsion is used as a lubricant.

DETAILED DESCRIPTION OF THE INVENTION

The oil-in-water-in-oil (O/W/O) emulsion described herein is a composition that comprises a first oil-in-water emulsion that is dispersed in a second oil.

The first oil-in-water emulsion comprises a first oil, water, an organic acid, and salt of organic acid. Suitable organic acids include naphthenic acid that is extracted from crude oil or crude oil distillate. Other organic acids are also suitable including, for example, organic sulfonic acid, aromatic sulfonic acid, (e.g., alkyl aromatic sulfonic acid), alkyl phosphoric acid (e.g., trialkyl mono phosphoric acid, oleic acid, naphthenic acid) and mixtures thereof.

The salt of organic acid and the organic acid may be naturally occurring in the first oil, or can be added to the first oil or to the water used to form the first oil-in-water emulsion. Preferably, organic acid will be present in a range of about 0.1 wt % to about 10 wt % based on the weight of the first oil-in-water emulsion. Preferably, the salt of organic acid will be present in an amount of about 0.01 wt % to about 10 wt % based upon the weight of the first oil-in-water emulsion. The organic salt can also be formed by using acid/base chemistry. For example, if the first oil contains a sufficient amount of organic acid, a base can be added to form the corresponding organic acid salt. If the first oil does not contain a sufficient amount of organic acid, acid can be added and then reacted with base to form the corresponding organic acid salt. Although organic acid salt may be added directly to the first oil, it is preferable to form the organic acid salt by acid/base chemistry directly in the first oil since many organic acid salts may not be soluble in the first oil.

In particular, the salts of naphthenic acid are believed to be interfacially active and possess a high hydrophilic-lipophilic balance (HLB). The HLB's for sodium, potassium or ammonium salts of naphthenic acids can range from 20 to 30. Such interfacially-active compounds favor the formation of oil-in-water emulsions, and are therefore preferred salts of organic acid. Commercial naphthenic acid sold by Pfatz & Baur is one example of commercial naphthenic acid that may be used in this invention. The first oil will preferably have an HLB of about 8 to about 16.

When acid/base chemistry is used to form the salts of organic acid, the base is preferably selected from bases of Group IA, Group IIA, and mixtures of Group IA and IIA bases. A sub-stoichiometric amount of base is preferably used. A stoichiometric amount is a 1:1 mole equivalent of base to acid. Hence, a sub-stoichiometric amount is less than a 1:1 mole ratio. Preferably at least about 20% to 70% of the acid (either naturally occurring in the oil, or added) will be neutralized or converted to its corresponding salt.

Use of a sub-stoichiometric amount of base to neutralize the organic acid converts a fraction of the organic acid in the oil to the corresponding sodium, potassium or ammonium salt so that the final composition is a mixture of the salt of the organic acid and free organic acid.

The first oil will preferably also contain asphaltenes, which will help stabilize the first oil-in-water emulsion. Asphaltenes are preferably present in an amount ranging from about 0.1 wt % to about 5 wt % based on the weight of the first oil-in-water emulsion. The asphaltenes may be naturally occurring in the first oil or added to the first oil and/or water used for emulsification.

Micron to sub-micron sized solid particles may also be added to the first oil to help stabilize the oil-in-water emulsion. The solid particles useful for this invention should have certain physical properties. If the solid particles are to be used in a porous subterranean formation, as will be explained in more detail below, the average particle size should be smaller than the average diameter of the pore throats in the porous subterranean formation. Particle size can be measured by a wide array of particle size analytical techniques, including laser light scattering, mesh screen classification, Coulter counting method, and settling velocity (which uses Stokes law to convert a solid sample's settling velocity in a fluid to an average particle size). However, each of these techniques produces an "effective" particle diameter, which is the result that would have been produced by corresponding test sample comprised of particles with a spherical shape. Consequently, a particle's effective diameter becomes a less accurate approximation of its true size as the particle's shape deviates further from a spherical shape. In most instances, however, particles are often irregular and nonuniform in shape.

Without intending to limit the scope of the invention, the FIGURE illustrates this point with a ternary diagram, 114, having three fundamental shape groups. The first group is a plate or pie shape, 102 and 104; the second is a bar or cylinder shape, 106 and 108, and the third is a cube or sphere shape, 110 and 112. Typically, particles composing the solids used for making a solids-stabilized emulsion disclosed herein will have some composite irregular shape that is somewhere between the two or three basic shape groups illustrated in ternary diagram, 114. Accordingly, the size of particles composing such solids are preferably determined using a scanning probe microscopy (SPM) technique. One example of such a technique is atomic force microscopy. Digital Instruments of Santa Barbara, Calif. manufactures an atomic force microscope (AFM) known as the Nanoscope Multimode™, which can be used to characterize the average size and shape of the solid particles.

Using AFM or some other SPM technique the maximum dimensions of a particle along its x, y, and z axes can be determined. Therefore, unless reference to an alternative particle size analysis method is otherwise indicated, reference to a particle size will mean the smallest of the three dimensions measured along a particle's x, y, and z axis, as measured by a SPM technique. In the case of a perfect sphere, 112, or cube, 110, each dimension is equal while in the case of a particle having the shape of a pie, 104, or plate, 102, the thickness of the particle, as measured along the z axis, is small relative to it length, x, and width y. The "average" particle size for a particular sample can be determined by obtaining a sufficient number of measurements, preferably 50 or more, of the smallest dimension for the array of particles being analyzed. The average size can be calculated using either the number of particles among the total measured having a particular x, y, or z value, whichever is smallest, or the weight contribution of the particles having a particular x, y, or z value, whichever is smallest, among the total weight for all particles measured.

If spherical in shape, the solid particles should preferably have an average size of about ten microns or less in diameter, more preferably about two microns or less, even more preferably about one micron or less and most preferably, 100 nanometers or less. If the solid particles are non-spherical in shape, they should preferably have an average surface area of about 200 square microns or less, more preferably about 20 square microns or less, even more preferably about ten square microns or less and most preferably, one square micron or less. The solid particles must also remain undissolved in both the oil and water phase of the emulsion under the conditions for which the emulsion is used.

If solid particles are used to stabilize the first oil-in-water emulsion, the particles should be added prior to emulsification in an amount corresponding to about 0.1 wt % to about 1 wt % based on the weight of the first oil. Preferably, micron to sub-micron sized solid particles that have hydrophobic and hydrophilic character will be used, i.e. the solid particles have amphiphilic character. Suitable solid particles include, for example, silica, clay, carbon, and mixtures thereof.

The water which is used to form the first oil-in-water emulsion can be pure water, as in distilled water, or it may be water that includes chlorides, sulfates, and carbonates of Group IA, Group IIA, and mixtures of Group IA and IIA. Hence brine produced at a well site is suitable as the water for the first oil-in-water emulsion.

The oil useful for the first and second oil in accordance with this invention can be vegetable oil, crude oil, crude oil distillate, lubricant base stock, asphaltic oil, synthetic silicone oil and mixtures thereof. Preferably, but not necessarily, the first and second oil will be the same oil. Preferably, the first and second oils will be compatible. Compatibility of the first and second oils can be tested by mixing the two oils in the ratio of 1:3 by weight. If no phase separation occurs, the oils are compatible.

The first oil-in-water emulsion is formed by combining the first oil, water, organic acids and salts of organic acids, as provided above, and solid particles (if any) and mixing until the oil-in-water emulsion is formed. Preferably, the first oil will comprise less than about 20 wt % of the first oil-in-water emulsion. Preferably, water will comprise at least 80% of the first oil-in-water emulsion. Mixing can be accomplished by static mixer, such as a paddle mixer. Preferably, mixing continues until oil droplets in the size range of 0.1 to 10 microns are suspended in the external water phase.

The formation of an oil-in-water-in-oil (O/W/O) emulsion can be accomplished by dispersing the first oil-in-water emulsion into a second oil, and mixing for a sufficient time period, preferably between 0.25 hours to 6 hours at temperatures in the range of 25° C. to 85° C. Mixing time is determined by observing the mixed sample periodically under an optical microscope. An O/W/O emulsion can be recognized by one of ordinary skill in the art as one where the oil-in-water droplets are dispersed in the second oil. Mixing is conducted preferably using mechanical mixers, such as but not limited to paddle mixers and concentric ring type mixers.

The O/W/O emulsion preferably will comprise between about 10 wt % to about 60 wt % of the first oil-in-water emulsion and about 90 wt % to about 40 wt % of the second oil.

The second oil may contain a stabilizer which may include micron to sub-micron sized solid particles (as described above for the first oil), naphthenic acids, asphaltenes and mixtures thereof. Preferably, the naphthenic acids present in both the first and second oil will have a molecular weight (MW) of >450, and be present in an amount ranging from about 0.1 wt % to about 10 wt % based on the total weight of the oil (i.e. both the first and second oils) in the O/W/O emulsion. It is desirable that the second oil be an asphaltenic oil, i.e. high in asphaltenes, generally greater than 0.1 wt % in the second oil. The asphaltenic content is determined as the amount of n-heptane insoluble component of the oil and is well known to a skilled artisan in petroleum composition analyses. The presence of asphaltenes favor water-in-oil emulsion formation and stability. Accordingly, the second step of the process results in an oil-in-water-in-oil (O/W/O) emulsion. If the second oil is deficient in asphaltenes, asphaltenes can be added. Alternatively, the second oil can be blended with another oil or an oil residue that is high in asphaltenes to provide the desired range of asphaltene content. Asphaltenes are the preferred stabilizer for the second oil since they are present in crude oils or can be added. Preferably the second oil will have an asphaltene content greater than or equal to 0.1 wt %, preferably about 2 wt % to about 25 wt % based on the total weight of oil in the O/W/O emulsion. Micron to sub-micron sized solid particles can also be used to stabilize the O/W/O emulsion, either alone or in conjunction with other stabilizers. The solid particles are preferably added to the second oil for concentration of about 0.1 wt % to about 5 wt % based on the total weight of oil in the O/W/O emulsion. The stabilizer present in the second oil will preferably yield an HLB in the second oil of about 1 to about 8.

The O/W/O emulsion described herein can be utilized to recover oil from subterranean formations. In this capacity, the O/W/O emulsion is used as a drive fluid to displace the oil in a subterranean formation. The use of a drive fluid in enhanced oil recovery operations is well known in the petroleum industry, and therefore methods of injecting a pusher fluid and recovering hydrocarbons will not be discussed in further detail herein. The viscosity of the O/W/O emulsion can be reduced by the addition of a gas as noted in U.S. Pat. Nos. 5,855,243 and 5,910,467.

The O/W/O emulsion described herein exhibits improved shear stability and shear-thinning characteristics compared to water-in-oil emulsions, as illustrated by the following laboratory experiments. The experiments are intended to illustrate examples of making and using the O/W/O emulsions of this invention.

An O/W/O made with Crude Oil #1 as the first and second oil was prepared. Crude Oil #1 has a total acid number (TAN) of 0.9. Sodium hydroxide base was added to Crude Oil #1 so that 50% of the acids were converted to their corresponding salts. A portion of Crude Oil #1 was then mixed with water in accordance with the disclosure above in a ratio of 40% oil and 60% water until an oil-in-water emulsion was formed. This first oil-in-water emulsion was then mixed in another portion of the base treated Crude Oil #1, forming the O/W/O emulsion.

This same process was repeated to form an O/W/O emulsion using Crude Oil #2 as both the first and second oil, with Crude Oil #2 first being diluted with n-decane (at a ratio of 19% n-decane to 81% Crude Oil #2). Crude Oil #2 has a TAN of 3.4.

Viscosity as a function of shear rate for the O/W/O emulsions made with Crude Oil #1 and Crude Oil #2 were compared to their water-in-oil emulsion counterparts. The water-in-oil counterparts or comparative examples were made by adding sodium hydroxide base to the respective crude oil and mixing. This step was followed by adding water to the sodium hydroxide treated crude oil and mixing until the respective water-in-oil emulsions were formed. The results of this comparison are provided in Table-1.

TABLE 1

| | Emulsion Viscosity (cP) at 60° C. | | | |
|---|---|---|---|---|
| Shear Rates | O/W/O Crude Oil #1 | W/O Crude Oil #1 | O/W/O Crude Oil #2 | W/O Crude Oil #2 |
| 1.92 | 1392 | 6553 | — | — |
| 3.84 | 1343 | 5734 | — | — |
| 9.60 | 1392 | 3439 | 819 | 1965 |
| 19.20 | 1515 | 3030 | 982 | 2047 |
| 38.40 | 1235 | 2372 | 1022 | 1922 |
| 76.80 | 1040 | 1958 | 999 | 1774 |
| 192.0 | 868 | 1580 | 993 | 1539 |
| 384.0 | 773 | 1349 | 838 | 1353 |

As shown in Table-1 the viscosities of the O/W/O emulsions made in accordance with this invention are lower than their corresponding water-in-oil emulsion counterparts at any given shear rate of measurement. An unexpected result with the O/W/O emulsions is that they have relatively less shear-thinning characteristics than their water-in-oil counterparts. The shear stability of the O/W/O emulsions to repeated cycles of measurements was noted to be superior to that of the corresponding water-in-oil emulsion.

Each of the above water-in-oil and O/W/O emulsions were stable to flow through a berea sand pack, as performed in accordance with the attached Addendum. No brine breakout was observed in any of the emulsion samples.

The present invention has been described in connection with its preferred embodiments. However, to the extent that the foregoing description was specific to a particular embodiment or a particular use of the invention, this was intended to be illustrative only and is not to be construed as limiting the scope of the invention. On the contrary, it was intended to cover all alternatives, modifications, and equivalents that are included within the spirit and scope of the invention, as defined by the appended claims.

ADDENDUM

Test for Emulsion Stability in Flow Through Porous Media

The observation that emulsions that are unstable will form two separate macroscopic phases, an oil/emulsion phase and a water phase, is relied upon in order to ascertain the stability of an emulsion on flow through porous media in a rapid, convenient assay. A volume of emulsion that passes completely through the porous media can therefore be centrifuged to form two distinct phases, whose volumes can be used as a measure of the emulsion stability—the greater the proportion of water or water originally in the emulsion, that forms a clear, distinct phase after passage and centrifugation, the more unstable the emulsion. A convenient parameter to measure stability is therefore the "brine-breakout" or "bbo", defined as the fraction of the water or brine that is in the emulsion that forms the distinct separate aqueous phase. Since it is a proportion, the bbo is dimensionless and ranges between one (maximally unstable) and zero (maximally stable). The brine breakout is measured under a well-defined set of conditions.

A commercially available special fitted micro-centrifuge tube that is comprised of two parts is used as the container for the experiment. The bottom part is a tube that catches any fluid flowing from the top tube. The top part is similar to the usual polypropylene microcentrifuge tube, except that the bottom is a fit that is small enough to hold sand grains back, but allows the easy flow of fluid. In addition, the tubes come supplied with lids to each part, one of which serves also as a support that allows the top to be easily weighed and manipulated while upright. They are available from Princeton Separations, Inc., Adelphia, N.J. and are sold under the name "CENTRI-SEP COLUMNS."

A heated centrifuge is used to supply the pressure to flow the emulsion fluid through a bit of sand placed in the upper tube. The centrifuge was supplied by Robinson, Inc., (Tulsa, Okla.) Model 620. The temperature is not adjustable, but stabilizes at 72° C. under our conditions. The top speed is about 2400 revolutions per minute (RPM) and the radius to the sandpack is 8 centimeters (cm), which gives a centrifugal force of 520 g. All weights are measured to the nearest milligram.

The columns come supplied with a small supply of silica gel already weighed into the tube. This is discarded, and the weights of both sections noted. About 0.2 grams (g) of sand is weighed into the top and 0.2±0.01 g of oil added to the top. Typical sands used for this experiment are Berea or Ottawa sands. The sand that is used in this test can be varied according to one's purpose. For simplicity, one may use unsieved, untreated Ottawa sand. This provides a convenient, system because the sand particles are rather large and free of clay. Alternatively, one may use one fraction that passes through 100 Tyler mesh, but is retained by a 150 mesh, and another fraction that passes through the 150 Tyler mesh, blended in a ten to one ratio respectively. The tube is weighed again, then centrifuged for one minute at full speed on the heated centrifuge. The bottom tube is discarded and the top is weighed again, which gives the amount of sand and oil remaining in the top. The sand is in an oil-wetted state, with air and oil in the pore space.

Next, 0.18±0.02 g of emulsion is placed on top of the wetted sand, and the top is weighed again. A bottom tube is weighed and placed below this tube to catch the effluent during centrifugation.

A separate bottom tube is filled with 0.2 to 0.5 g of emulsion only. This serves as a control to determine if the centrifuging of the emulsion, without it being passed through the oil-wetted sand, causes brine to break from the emulsion. This step is known as the microcentrifuge test, and is also an indicator of emulsion stability.

Both tubes are then centrifuged for a noted time (15 to 45 minutes) depending on the oil viscosity and centrifuge speed. The object in adjusting the length of time is to get to a point where at least 75% of the emulsion arrives in the bottom tube after passing through the sand. If less than that appears, the assembly is centrifuged for an additional time(s).

After spinning, the weight of the top and bottom pieces are again recorded. If the emulsion is unstable, a clear water phase will be visible in the bottom of the tube, below an opaque, black emulsion/oil phase. The volume of water in the bottom receptacle is then measured by pulling it up into a precision capillary disposable pipette (100-200 microliters) fitted with a plunger. These are supplied by Drummond Scientific Co. (under the name "Wiretroll II"). The length of the water column is measured and converted to mass of water through a suitable calibration curve for the capillary. The water breakout can be then calculated from these measurements and the knowledge of the weight fraction of water in the emulsion originally.

What is claimed is:

1. A method for preparing an oil-in-water-in-oil emulsion comprising the steps of:
    (a) forming a first oil-in-water emulsion comprising a first oil, water, about 0.1 wt % to about 10 wt % of an organic acid, and about 0.01 wt % to about 10 wt % of a salt of an organic acid, all based on the weight of said first oil-in-water emulsion, wherein said salt of organic acid comprises a salt of naphthenic acid;
    (b) dispersing said first oil-in-water emulsion in a second oil.

2. The method of claim 1, said water comprising at least about 80 wt % of said first oil-in-water emulsion.

3. The method claim 1, said first oil comprising less than about 20 wt % of said first oil-in-water emulsion.

4. The method of claim 1, said first oil-in-water emulsion comprising about 10 wt % to about 60 wt % of said oil-in-water-in-oil emulsion.

5. The method of claim 1, said second oil comprising about 40 wt % to about 90 wt % of said oil-in-water-in-oil emulsion.

* * * * *